(12) United States Patent
Fujioka

(10) Patent No.: US 6,591,012 B1
(45) Date of Patent: Jul. 8, 2003

(54) DATA STORING/REPRODUCTION METHOD AND A SYSTEM

(75) Inventor: Yoshihide Fujioka, Kobe (JP)

(73) Assignee: Canopus Co., Ltd., Hyogo (JP)

( * ) Notice: Subject to any disclaimer, the term of this patent is extended or adjusted under 35 U.S.C. 154(b) by 0 days.

(21) Appl. No.: 09/301,835

(22) Filed: Apr. 29, 1999

(30) Foreign Application Priority Data

May 1, 1998 (JP) ............................................. 10-122349
Jun. 17, 1998 (JP) ............................................. 10-169912

(51) Int. Cl.⁷ ................................................. G06K 9/36
(52) U.S. Cl. ........................ 382/232; 348/565; 358/296
(58) Field of Search .......................... 382/232; 348/565, 348/558; 358/296; 386/12, 85

(56) References Cited

U.S. PATENT DOCUMENTS

| | | | | |
|---|---|---|---|---|
| 4,122,477 A | * | 10/1978 | Gallo ............................. | 358/4 |
| 5,216,514 A | * | 6/1993 | Hong et al. ................. | 358/296 |
| 5,568,192 A | | 10/1996 | Hannah ....................... | 348/222 |
| 5,576,839 A | | 11/1996 | Morimoto et al. .......... | 386/113 |
| 5,990,946 A | * | 11/1999 | Sakurai et al. ............. | 348/222 |
| 6,097,879 A | * | 8/2000 | Komatsu et al. ............ | 386/85 |
| 6,134,631 A | * | 10/2000 | Jennings, III ............... | 711/117 |
| 6,166,777 A | * | 12/2000 | Ock ............................ | 348/565 |

FOREIGN PATENT DOCUMENTS

| | | | |
|---|---|---|---|
| DE | 197 13 635 | 11/1997 | .......... H04N/9/896 |
| JP | 5-83666 | 4/1993 | .......... H04N/5/782 |
| JP | 5-314736 | 11/1993 | .......... G11B/27/28 |
| JP | 5-316519 | 11/1993 | .......... H04N/9/04 |
| JP | 9-167442 | 6/1997 | .......... G11B/20/10 |
| JP | 9-275575 | 10/1997 | .......... H04N/9/87 |
| JP | 9-284806 | 10/1997 | .......... H04N/9/804 |

OTHER PUBLICATIONS

Lettieri, "Storing Multimedia Images in a PC", Sep. 1994, Conference Record, WESCON/94, pp. 154–159.*

* cited by examiner

*Primary Examiner*—Anh Hong Do
(74) *Attorney, Agent, or Firm*—Merchant & Gould P.C.

(57) ABSTRACT

A DV camera 38 provides DV data recorded on a tape 52 to a PCI bridge 43 through a DV data output terminal 57 while decompressing the DV data. The DV data thus decompressed are converted into analog signals with a video encoder 58 and outputted through an analog video signal output terminal 59. A video decoder 42 converts the analog video signals into digital signals. The PCI bridge 43 outputs the digital data to a graphic card 34. In this way, moving pictures provided from the DV camera 38 are displayed on a CRT 32. The PCI bridge 43 transfers the DV data provided by an interface 41 to a memory. The data stored in the memory 27 is written into the hard disk 26 under control of the CPU 23.

10 Claims, 4 Drawing Sheets

DATA STORING/REPRODUCTION METHOD AND A SYSTEM

CROSS-REFERENCE TO RELATED APPLICATION

The entire disclosure of both Japanese Patent Application No. Hei 10-122349 filed on May 1, 1998 and Hei 10-169912 filed on Jun. 17, 1998 including specification, claims, drawings, and summary is incorporated herein by reference in its entirety.

BACKGROUND OF INVENTION

1. Field of the Invention

This invention relates to a storing/reproduction system of compressed image data provided by a compressed image data supply apparatus.

2. Description of the Prior Art

A system as shown in FIG. 4 is known as a system for storing image data provided by a digital video (hereinafter referred to as DV) camera to a computer.

In the system, DV data outputted by the DV camera 38 are provided to a peripheral component interconnect (hereinafter referred to as PCI) bridge 66b through an IEEE1394 interface 66a. The DV data thus provided are stored temporarily in a memory 27 under the control of the PCI bridge 66b. The DV data stored in the memory 27 are decoded (decompressed) and transferred to a graphic card 34 under the control of a CPU 23. The graphic card 34 outputs analog RGB signals to a cathode ray tube (hereinafter referred to as CRT) 32 in accordance with the decoded data. In this way, images are displayed on the CRT 32 in accordance with the DV data thus outputted. At that time, the DV data are stored in a hard disk 26 while temporarily buffering the DV data in the memory 27 in accordance with a retrieval initiation command in parallel with the data transfer to the graphic card 34 under the control of the CPU 23. The DV data provided by the DV camera 38 can be stored while displaying them on the CRT 32 in video overlay manner.

The system described above, however, has the following problems to be solved. In order to display the DV data on the CRT 32 in the video overlay manner, decoding of the DV data needs to be carried out under the real-time basis. Not all the frames can be processed with the CPU 23 when it has lower processing capabilities than it should have. Consequently, a part of the frames might be missed and/or other trouble(s) may arise as a result of the low processing capabilities.

A dedicated hardware for decoding the DV data such as a DV compressor/decompressor (hereinafter referred to as DV CODEC) is needed in order to resolve the problems described above.

The problems arise not only for storing DV data, but also arise for reproducing the DV data stored in the hard disk 26 when the DV data are read out therefrom.

SUMMARY OF THE INVENTION

It is an object of the present invention to provide a data storing system capable of displaying image data in video overlay manner during the data storing without causing lack of frame(s) and/or other trouble(s) even when a computer having a lower processing capabilities with a simple structure is used for the system.

It is another object of the present invention to provide a data reproduction system capable of reproducing images without lack of frame(s) even when a computer having a lower processing capabilities with a simple structure is used for the system.

It is further object of the present invention to provide a board or a method used for these systems.

In accordance with the present invention, there is provided a data storing/reproduction system capable of switching to one of a storing mode and a reproduction mode, compressed image data being stored while displaying images on a display screen in the storing mode, and the stored compressed data being reproduced in the reproduction mode, the system comprises:

A) a compressed image data apparatus capable of switching to one of a first operation mode and to a second operation mode, the apparatus performing the following steps in each of the operating modes;
  a1) in the first operating mode, the apparatus outputting the compressed image data being outputted while outputting analog video signals corresponding to the compressed image data provided therefrom in the first operating mode, the analog video signals being converted from uncompressed digital signals, and the uncompressed digital signals being decompressed from the compressed image data,
  a2) in the second operation mode, the apparatus being capable of being inputted compressed image data therein from outside and outputting analog video signals converted from uncompressed digital image data which is decompressed from the inputted compressed image data provided therefrom, and B) a computer system including;
  b1) means for storing compressed image data therein when the compressed image data are provided thereto,
  b2) means for displaying image data provided thereto,
  b3) means for converting analog video signals into digital data, the converting means being connected to the apparatus, and
  b4) control means connected to the apparatus, the control means carrying out the following steps;
    b41) providing compressed image data received from the apparatus to the storing means while providing digital data converted by the converting means to the display means, the apparatus being switched to the first operation mode, and
    b42) providing compressed image data stored in the storing means to the apparatus, the apparatus being switched to the second operation mode, and providing digital data to the display means when analog video signals decompressed by the apparatus are outputted therefrom, the digital data being converted by the converting means from the decompressed analog video signals.

Also, in accordance with the present invention, there is provided a data storing system capable of storing compressed image data while displaying images on a display screen in accordance with the compressed image data, the system comprises:

A) a compressed image data apparatus outputting compressed image data while outputting analog video signals corresponding to the compressed image data therefrom, and B) a computer system including;
  b1) means for storing compressed image data therein when the compressed image data are provided thereto, b2) means for displaying image data in accordance with the digital data provided thereto, b3) means for converting analog video signals provided by the apparatus into digital data, and b4) control means connected to the apparatus and the converting means, the control means carrying out the following step;

b41) providing digital data converted by the converting means to the display means while providing compressed image data outputted by the apparatus to the storing means.

Further, in accordance with the present invention, there is provided a data storing system capable of storing compressed image data while displaying images on a monitor in accordance with the compressed image data, the system comprises:

A) a compressed image data apparatus, outputting analog video signals when compressed image data are outputted therefrom, the analog video signals corresponding to the compressed image data, B) a computer including;

b1) a memory, storing compressed image data provided thereto temporarily, b2) a central processing unit, performing control of storing the compressed image data into a hard disk, the compressed image data being stored in the memory, b3) a monitor for the computer, displaying image data provided thereto, and b4) a graphic board, controlling display of the monitor, and C) an overlay display/storing board including;

c1) a video decoder, converting analog video signals into digital data, the analog video signals being provided by the apparatus, c2) a compressed image data interface, receiving compressed image data provided by the apparatus, the compressed image data interface being connected to the apparatus, c3) a display/storing controller, providing digital data outputted by the video decoder to the graphic board part while storing compressed image data into the memory through the interface, the display/storing controller being connected to the video decoder and the compressed image data interface.

Still further, in accordance with the present invention, there is provided an overlay display/memory board comprises:

a compressed image data interface connected to a compressed image data apparatus, the interface receiving compressed image data provided by the apparatus, a video decoder converting analog video signals into digital data, the analog video signals being outputted by the apparatus, the analog video signals corresponding to the compressed image data, and a display/storing controller connected to the video decoder, the interface and a graphic board, the controller providing digital data outputted by the video decoder to the graphic board through a bus line while storing compressed image data to a memory of the computer through the interface via the bus line.

In accordance with the present invention, there is provided an overlay display/memory board capable of storing compressed image data from a compressed image data apparatus while displaying images on a display screen of a computer system in accordance with the compressed image data, and capable of reproducing the stored data, the board being connected to the apparatus capable of switching to one of a first operation mode and to a second operation mode, the apparatus performing the following steps in each of the operating modes;

a1) in the first operation mode, the apparatus outputting the compressed image data while outputting analog video signals corresponding to the compressed image data, a2) in the second operation mode, the apparatus outputting analog video signals, the signals corresponding to compressed image data inputted from outside, the board comprises:

a video decoder for converting analog video signals into digital data, the analog video signals being provided by the apparatus, a compressed image data interface for receiving and transmitting the compressed image data between the apparatus, the interface being connected to the apparatus, and a display/storing controller connected to the apparatus, the controller carrying out the following steps;

b1) providing digital data converted by the video decoder to a graphic board which controls display of a monitor of the computer system through a bus line while storing compressed image data received through the interface to a memory of the computer system in an overlay display/memory mode, and b2) outputting the digital data provided by the video decoder to the graphic board through the bus line while providing compressed image data stored in a hard disk of the computer system to the apparatus through the interface in a playback/display mode.

Also, in accordance with the present invention, there is provided a data storing/reproduction method for storing/reproducing compressed image data provided by a compressed image data apparatus, the apparatus capable of switching to one of a first operating mode and a second operating mode, the apparatus performing the following steps in each of the operating modes;

a1) in the first operating mode, the apparatus outputting compressed image data while outputting analog video signals converted from uncompressed digital image data which is decompressed from the compressed image data, a2) in the second operating mode, the apparatus outputting analog video signals converted from uncompressed digital image data which is decompressed from the inputted compressed image data from outside, the method comprises the steps of:

storing the compressed image data provided by the apparatus in a data storing medium while displaying images in accordance with the analog video signals provided by the apparatus during a data storing mode when the apparatus is in the first mode, and providing the compressed image data stored in the data storing medium to the apparatus, and displaying images on a display screen in accordance with the analog video signals provided by the apparatus during a data reproduction mode when the apparatus is in the second mode.

Further, in accordance with the present invention, there is provided a data storing method for storing compressed image data provided by a compressed image data apparatus in a data storing medium a computer system while displaying images in accordance with the compressed image data on a display screen of the computer system, the method comprises the steps of:

connecting the apparatus having a compressed image data terminal and an analog video signal terminal with the computer system, the apparatus outputting compressed image data through the data terminal, and outputting analog video signals through the signal terminal, the analog signals being converted from uncompressed digital image data which is decompressed from the compressed image data outputted through the data terminal, and storing the compressed image data provided by the apparatus in the storing medium of the computer system without carrying out decompression thereof while displaying images on the display screen of the computer system in accordance with the analog video signals provided by the apparatus.

Still further, in accordance with the present invention, there is provided a data reproduction method for displaying images in accordance with compressed image data stored in a data storing medium of a computer system on a display screen thereof, the method comprises the steps of:

connecting a compressed image data apparatus with the computer system, the apparatus carrying out decompression of compressed image data and converting the decompressed image data into analog signals, providing the compressed image data stored in the data storing medium to the apparatus, and displaying images on the display screen in accordance with the analog signals received from the apparatus, the analog signals being decompressed by the apparatus.

While the novel features of the invention are set forth in a general fashion, both as to organization and content, it will be better understood and appreciated, along with other objects and features thereof, from the following detailed description taken in conjunction with the drawings.

THE BEST MODE OF EMBODIMENTS FOR CARRYING OUT THE PRESENT INVENTION

1. Functional Block Diagram

Figure 1:
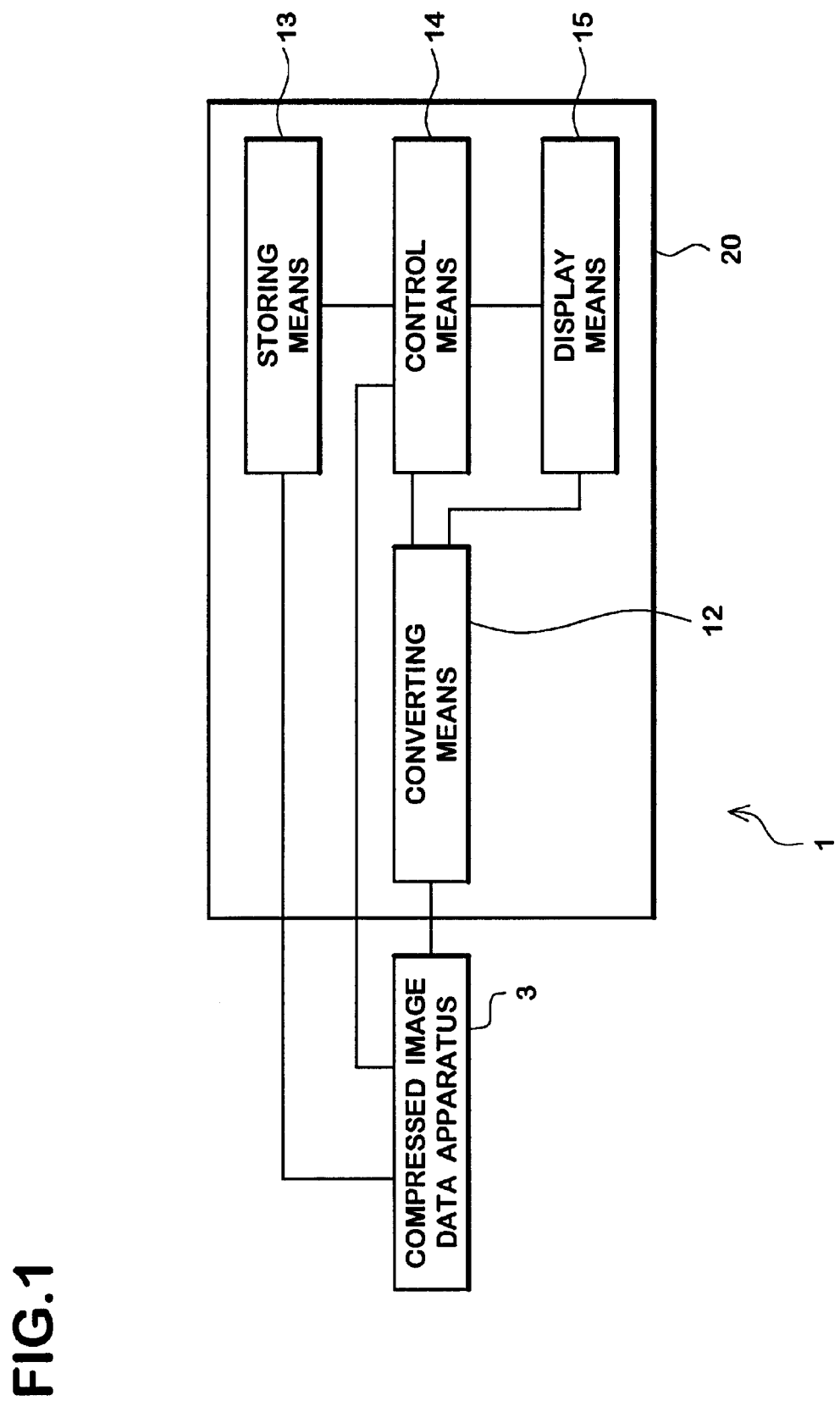
FIG. 1 is a functional block diagram of a data storing/ reproduction system 1 according to the present invention.

An embodiment of the present invention will be described herein referring to the drawings. FIG. 1 is a functional block diagram of a data storing/reproduction system 1. A data storing/reproduction system 1 is a system capable of storing image data therein while displaying images on a display of a computer system in accordance with image data provided by a compressed image data apparatus, the system 1 also capable of reproducing the image data thus stored.

The apparatus 3 is switchable to either a first operation mode or a second operation mode. The apparatus 3 both compressed DV data image data and analog video signals corresponding to the compressed image data in the first operation mode. The apparatus 3 is capable of accepting inputted compressed image data therein from outside and analog video signals decompressed and converted by the apparatus 3 are then outputted therefrom in a second operation mode.

Further, the computer system 20 includes storing means 13, display means 15, converting means 12, and control means 14.

The storing means 13 stores compression image data when the image data are provided thereto. Also, the display means 15 displays images provided thereto. Further, the converting means 12 connected with the apparatus 3 converts the analog video signals into digital data.

The image data converted by the converting means 12 are provided to the display means 15 while storing the compressed image data provided by the apparatus 3 in the storing means 13 under the control of the control means 14 when the apparatus 3 is in the first operation mode, the converting means 12 converting analog video signals provided by the apparatus 3 into the image data.

Further, the compressed image data stored in the storing means 13 are provided to the apparatus 3, and the analog video signals outputted by the apparatus 3 are converted into digital data by the converting means 12 and provided to the display means 15 under the control of the control means 14 when the apparatus 3 is in the second mode.

2. Hardware Structure

Figure 2:
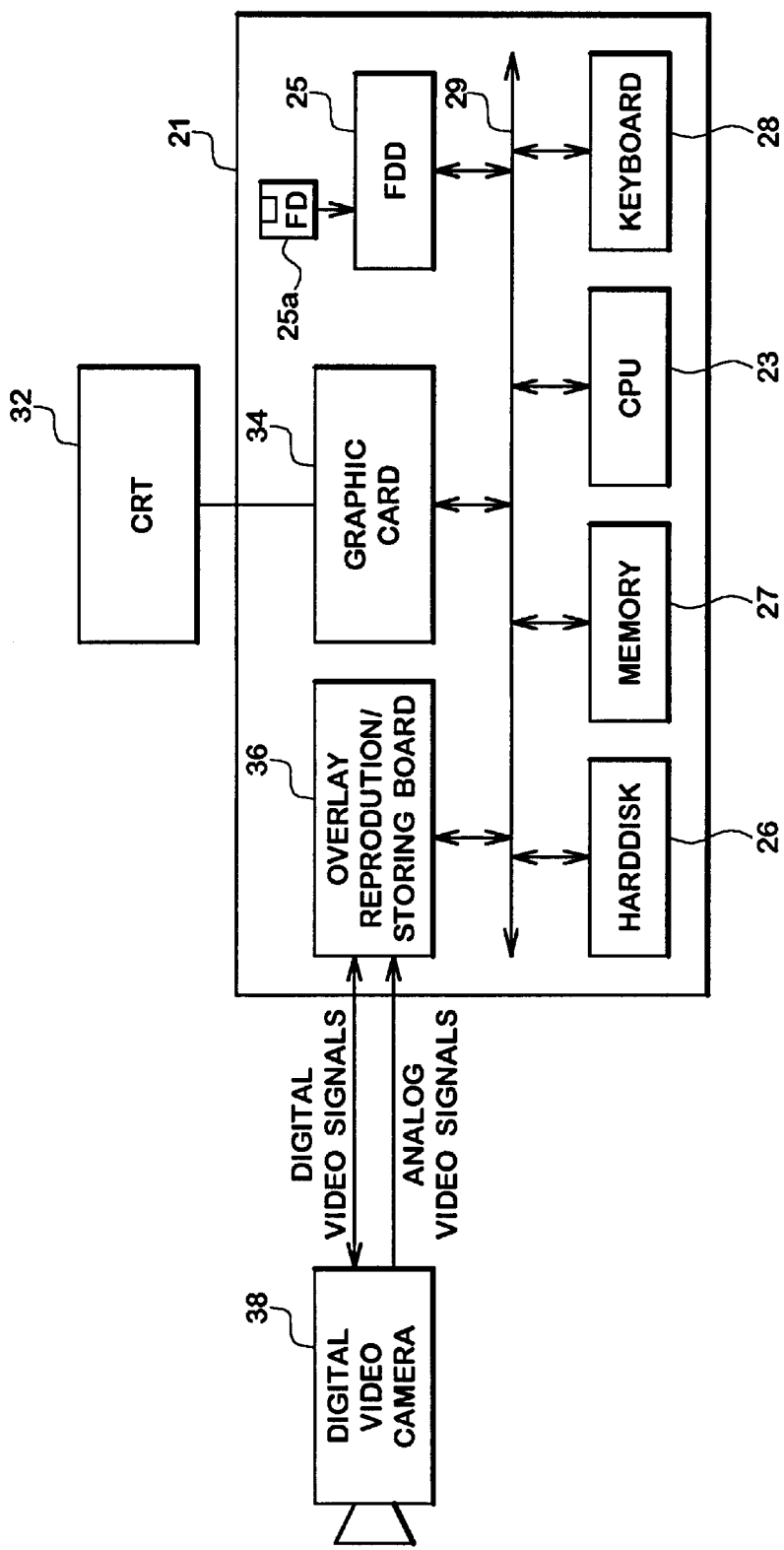
FIG. 2 is a block diagram illustrating an example of hardware structure of the data storing/reproduction system 1 according to the present invention.

FIG. 2 shows an example of hardware structure of the system 1. The system 1 comprises a DV camera 38, a computer 21 and a CRT 32. In this embodiment, the DV camera 38 forms a compressed image data apparatus, both the computer 21 and the CRT 32 act as the computer system, and the DV data forms the compressed image data.

Details of the DV camera 38 will be described herein with reference to FIG. 3. The DV camera 38 includes an image data processor 55, a DV CODEC 53, an IEEE1394 interface (hereinafter referred to as interface) 51, a controller 54, a mode selection switch 56, a DV data output terminal 57, a video encoder 58, and an analog video signal output terminal 59. Other mechanisms such as drive mechanisms, optical systems, and an liquid crystal display (hereinafter referred to as LCD) all of which equipped with the available DV cameras are omitted from the drawing for clarity.

The data processor 55 converts the image data provided thereto into YUV digital signals. The DV CODEC 53 compresses the YUV digital signals in a digital form when the YUV digital signals are provided to thereto. The compressed digital data are recorded on a video tape 52 while providing them to the interface 51 for outputting through the output terminal 57. Further, the DV CODEC 53 converts DV data into digital YUV data and provides them to the video encoder 58 when the DV data are provided thereto. The encoder 58 converts the YUV digital signals provided either by the data processor 55 or the DV CODEC 53 into analog video signals and outputs the analog signals through the output terminal 59.

The mode selection switch 56 is used for switching operation modes of the DV camera 38 to either a picture recording mode or a playback mode. In the picture recording mode, the controller 54 connects the data processor 55 and the DV CODEC 53 so as to provide the YUV digital signals outputted by the data processor 55 of the DV CODEC 53. In this way, the image signals provided by the data processor 55 are compressed by the DV CODEC 53 under one frame basis, and the compressed signals are recorded on the video tape 52 while outputting the compressed signals from the output terminal 57 through the interface 51. Further, the YUV digital signals provided by the data processor 55 are converted into analog video signals with the encoder 58, and the analog signals thus converted are outputted through the output terminal 59.

In the playback mode, the controller 54 provides the DV data recorded on the tape 52 to the interface 51. As a result, the DV data recorded on the tape 52 are outputted through the output terminal 57. Further, the DV data recorded on the tape 52 are provided to the DV CODEC 53 under the control of the controller 54. The DV data thus provided are decompressed with the DV CODEC 53 and outputted to the encoder 58. The encoder 58 converts the decompressed data into analog video signals, and provides the analog video signals to both an LCD (not shown) and to the output terminal 59. Consequently, images of the DV data recorded on the tape 52 are displayed on the LCD while outputting the analog video signals through the output terminal 59.

In this embodiment, both the picture recording mode and the playback mode for reproducing the data recorded on the tape form the first operation mode.

Further, the controller 54 provides for DV data inputted from external equipment and the like to the DV CODEC 53 when no output of the tape is detected, and inputs of DV data from the external equipment through both the output terminal 57 and the interface 51 are detected. The DV data thus provided are decompressed by the DV CODEC 53. The data thus decompressed are converted into analog video signals by the encoder 58. Consequently, images of the DV data inputted by the external equipment are displayed on the LCD while outputting the analog video signals through the output terminal 59.

In this embodiment, the playback mode for reproducing the DV data inputted by the external equipment forms the second operation mode.

Details of the computer 21 will be described herein with reference to FIG. 2. The computer 21 includes an overlay reproduction/storing board 36, a hard disk 26, a keyboard 28, a memory 27, a CPU 23, a flexible disk drive (hereinafter referred to as FDD) 25, a graphic card 34 and a bus line 29.

The CPU 23 controls other parts through the bus line 29 in accordance with a control program stored on the hard disk 26.

The control program is a program which is installed in the hard disk 26 by reading out from a flexible disk 25*a* through the FDD 25. The control program can also be installed on the hard disk 26 from a computer readable media substantially incorporated with program(s) stored on CD-ROMs, IC cards or the like, as well as flexible disk(s). Further, the control program may be downloaded to a hard disk 26 through a communication line.

In this embodiment, the control program stored on the flexible disk(s) is executed indirectly by the computer by installing the control program on the hard disk 26 from the flexible disk(s). But, it is not limited to do that, the control program stored on flexible disk(s) 25*a* can be executed directly by the computer system through the FDD 25. The control program which can be executed by the computer used in this embodiment is not only the program being executed directly by the computer by installing it under as is condition, but the control program in the embodiments described herein also includes a control program which needs to be converted to other form(s) such as decompressed data and so on as well as another control program which can be executed on the computer which combines with other modules such as operating systems or a library.

The DV data provided by the DV camera 38 are also stored on the hard disk 26. Various calculation results as well as the DV data are stored in the memory 27. Further, the CRT 32 is connected to the graphic card 34.

Details of the board 36 will be described herein referring back to FIG. 3. The board 36 includes an IEEE1394 interface (hereinafter referred to as interface) 41, a video decoder 42, a PCI bridge, 43, a DV data input terminal 47, and an analog video signal input terminal 49. The video decoder 42 is connected to the input terminal 49. And the interface 41 is connected to the input terminal 47. Further, the video decoder 42 converts the analog video signals provided through the input terminal 49 into digital data and provides the digital data to the PCI bridge 43. The DV data outputted to the input terminal 47 are provided to the PCI bridge 43 under the control of the interface 41. The PCI bride 43 outputs the digital data provided by the decoder 42 to the graphic card 34 shown in FIG. 2. In addition, the PCI bridge 43 outputs the DV data provided by the interface 41 to the memory 27 shown FIG. 2 in accordance with both initiation and termination commands for retrieving the DV data, both provided by the CPU 23 shown in FIG. 2. Detailed procedures of the commands will be described later. In other words, the board 36 can carry out a direct memory access (DMA) without using the CPU 23, so no DV CODEC needs to be mounted therein.

3. Overlay Playback/Reproduction Procedures

Next, procedures of video overlay storing/reproduction according to the present invention will be described herein. Procedures of video capturing in which image data recorded on the tape 52 installed in the video camera 38 are displayed on the CRT 32 in overlay manner while storing a desired part of the data on the hard disk will be described as an example herein.

An operator of the system connects between the DV camera 38 and the board 36 so as to communicate data therebetween. Practically, the operator connects between the output terminals 57, 59 and the input terminals 47, 49 respectively as shown in FIG. 3. Both the DV data terminal 47 and the terminal 57 form a compressed image data terminal in this embodiment.

The operator enters a video capturing initialization command through the keyboard 28. On receipt of the command, the CPU 23 initializes the board 36.

Reproduction of data recorded on the tape 52 is carried out by the operations of the operator such as insertion of the tape 52 into the DV camera 38 and carrying out necessary steps for playback mode. The DV CODEC 53 shown in FIG. 3 decompresses DV data provided from the tape 52, and the data thus decompressed are converted into analog signals by the video encoder 58, further the analog signals are outputted through the output terminal 59. The analog signals thus outputted are provided to the video decoder 42 through the input terminal 49. The analog signals provided to the video decoder 42 are converted into digital signals thereby, and the converted signals are outputted to the PCI bridge 43. The PCI bridge 43 outputs the digital signals to the graphic card 34 via a bus line (a PCI bus line). In this way, the video images recorded on the tape 52 in the DV camera 38 are displayed on the CRT 32 as moving pictures.

The operator, who watches the moving pictures displayed on the CRT, enters the initiation command of DV data through the keyboard 28 when desired imagers are displayed thereon. Upon entering the initiation command, the CPU 23 provides it to the PCI bridge 43 shown in FIG. 3.

By the way, the original DV data of the moving pictures displayed on the CRT 32 are provided to the PCI bridge 43 through the DV CODEC 53 of the DV camera 38, the interface 51, the terminal 57, the DV data terminal 47 of the board 36, and the interface 41.

The DV data provided by the interface 41 are transferred to the memory 27 shown in FIG. 2 when the PCI bridge 43 receives the initiation command. The CPU 23 transfers the DV data stored in the memory 27 to the hard disk 26 when the transmission of the DV data is detected thereby.

The operator, who watches the moving pictures displayed on the CRT, enters a termination command of DV data retrieval through the keyboard 28 when the retrieval of the desired images is completed. Upon entering the termination command, the CPU 23 provides the termination command to the PCI bridge 43 shown in FIG. 3. The PCI bridge 43 stops the transmission of the DV data to the memory 27.

Moving pictures are continuously displayed on the CRT 32 during the data storing in the memory 27 because the PCI bridge 43 outputs both the data from the interface 41 and that from the video decoder 42 so as not to collide with each other.

The following procedures are carried out in the system according to the present invention. The DV camera 38 outputs DV data recorded on the tape 52 and being reproduced thereby to the PCI bridge 43 through the terminal 57 while outputting analog video signals being decoded and converted from the DV data to the output terminal 59. The video decoder 42 converts the analog signal thus outputted into digital signals. The PCI bridge 43 outputs the DV data received from the DV camera 38 to the graphic card 34. In this way, the video images outputted from the DV camera 38 are displayed on the CRT 32. Also, the PCI bridge 43 transfers the DV data provided by the interface 41 to the memory 27. The data stored in the memory 27 is written on the hard disk 26 under the control of the CPU 23. The DV data recorded on the tape 52 in the DV camera 38 can be displayed on the monitor of the computer system while storing desired part of the moving pictures in the storing medium of the computer by carrying out these procedures.

Images for monitoring and that for storing are outputted respectively through the analog video signal output terminal and the DV data output terminal. The following advantages can be achieved by carrying out the separate output.

One of the advantages is that inputted DV data can be stored on a hard disk while monitoring them as moving pictures which move smoothly under no lack of frames without additional hardware(s) such as a board for decompression of DV data. Further advantage is that no decoding is required by the CPU using a program, so that CPU load may be decreased. Especially, the PCI bridge 43 transfers DV data to the memory 27 by using bus mastering technique without using the CPU 23 in the above-mentioned embodiments. In this way, the CPU load can further be decreased. Additional advantage is that the DV CODEC, an expensive component, is not required in the system since the hardware installed in the DV camera is used as substitution thereof. As a result, the overall system can be produced in a low manufacturing cost.

The interface 41 and the decoder 42, both providing data to the PCI bridge 43 are mounted on the board 36, and the PCI bridge 43 outputs both the data from the interface 41 and that from the video decoder 42 so as not to collide with each other. In this way, one additional vacancy in the PCI slots can be expected in comparison with when each of the interface 41 and the video decoder 42 is mounted separately on the board 36.

Still another advantage is that no driver for controlling the video decoder 42 is required in the system in comparison with when the video decoder 42 is mounted on the graphic card 34.

Reproduction of the DV data stored in the hard disk is carried out as follows in the system described earlier. The operator turns the mode selection switch 56 of the DV camera 38 to the playback mode, and then enters a playback command though the keyboard 28.

Upon receipt of the command, the CPU 23 provides it to the PCI bridge 43. Also, the CPU 23 reads out the DV data from the hard disk 26 and transfers it to the memory 27. The PCI bridge 43 reads out the DV data from the memory 27 and transfers it to the DV camera 38 through the interface 41. The DV CODEC 53 decodes and converts the DV data thus transferred into analog signals, and the analog signals are outputted therefrom through the output terminal 59. The video decoder 42 converts the analog video signals into digital data and provide them to the PCI bridge 43. The PCI bridge 43 transfers the digital data directly to a frame memory in the graphic card 34. In this way, the DV data stored in the hard disk 26 can be displayed on the CRT 32.

The PCI bridge 43 controls the timing between data-reading of the DV data from the memory 27 and data-transfer of the DV data received from the video decoder 42 under time sharing basis in such a manner that both of the processes seems to be carried out simultaneously.

4. Other Embodiments

Although, the DV data recorded on the tape 52 are stored in the hard disk 26 while the data are displayed on the CRT 32 in video overlay manner in the embodiments described earlier, similar procedures to the embodiments can be carried out even when the DV camera 38 is in the picture recording mode because both DV data and analog video signals are outputted from the camera 38.

Though, a part of the DV data provided by the DV camera 38 are stored in the hard disk 26 by entering either of the initiation command or the termination command in the embodiments described earlier, complete DV data provided by the DV camera 38 may be stored in the hard disk 26. In that case, the operator may put the computer system in a state capable of carrying out video capturing while providing desired moving pictures from the DV camera 38.

Although, both the initiation command and the termination command are entered through the keyboard 28 in the embodiments described earlier, these commands may be inputted through other input means such as a mouse and the like.

In the embodiments described above, digital overlay technique in which the video decoder 43 converts the analog video signals provided by the DV camera 38 into a data format capable of being processed with the graphic card 34, and the PCI bridge 43 transfers the converted data to the graphic card 34, is employed. Alternatively, analog overlay technique in which signals outputted from both the graphic card and additional frame memory are synthesized with an analog circuit and outputted to the monitor, the display rate of the frame memory corresponding to that of the graphic card 34, may be used instead of the digital overlay technique.

In the embodiment described earlier, the data processor 55 converts the image data into YUV digital signals. The data processor 55 may convert the image data into other formats of digital signals such as RGB digital signals.

DV data are used as the compressed image data in the embodiment described earlier, the compressed image data includes a concept which represents all the data once compressed and need to be decompressed when they are displayed. For instance, the data to be processed in Moving Picture Experts Group (hereinafter referred to as MPEG) or in Joint Photographic Experts Group (hereinafter referred to as JPEG) may be used as the data to be transformed with discrete cosine transform (hereinafter referred to as DCT). The data compressed in other method such as wavelet transform or that compressed in vector quantization may also be used as the compressed image data. Further, data transform method capable of reversible may also be used in addition to the data transform incapable of reversible.

The DV camera, used as a DV imaging means capable of carrying out picture recording is used as a compressed image data apparatus, other apparatus such as a computer which installs a DV board or a DV deck may also be used as the compressed image data apparatus.

Although, the compressed image data provided by the compressed image data apparatus are stored into a magnetic data storing medium such as the hard disk in the embodiment described earlier, the compressed image data may also be stored into other kinds of data storing mediums such as an optical data storing medium and an electrical data storing medium. The compressed image data may further be stored into data storing mediums such as a storing medium defined by a ZIP format, a compact disk-recordable (CDR), a mini disk (MD), a phase change dual disk (PD disk), a digital video disc-random access memory (DVDRAM), and a ferroelectric memory and the like.

Both a computer software and the CPU 23 are used for realizing functions shown in FIG. 1 in the above embodiments, a part of or all of the functions can be realized by a computer hardware such as logic circuits or the like.

In a data storing/reproduction system according to the present invention, the apparatus performs the following steps in each of the operating modes; in the first operating mode, the apparatus outputs the compressed image data being outputted while outputting analog video signals corresponding to the compressed image data provided therefrom, the analog video signals being converted from uncompressed digital signals, and the uncompressed digital signals being decompressed from the compressed image data, and in the second operation mode, the apparatus being capable of being inputted compressed image data therein from outside and outputs analog video signals converted from uncompressed digital image data which is decompressed from the inputted compressed image data provided therefrom. The control means connected to the apparatus, carries out the following steps; providing compressed image data received from the apparatus to the storing means while providing digital data converted by the converting means to the display means, the apparatus being switched to the first operation mode, and providing compressed image data stored in the storing means to the apparatus, the apparatus being switched to the second operation mode, and providing digital data to the display means when analog video signals decompressed by the apparatus are outputted therefrom, the digital data being converted by the converting means from the decompressed analog video signals. In this way, both data storing with visual confirmation of the inputted images and data reproduction can be carried out by the system having a simple structure.

In a data storing system according to the present invention, control means is connected to a compressed image data apparatus and converting means, and the control means carries out a step for providing digital data converted by the converting means to display means while providing compressed image data outputted by the compressed image data apparatus to storing means. In this way, data storing with visual confirmation of the inputted images can be carried out by the system having a simple structure.

In a data storing system according to the present invention, a compressed image data apparatus outputs analog video signals corresponding to compressed image data when the compressed image data are outputted therefrom. The compressed image data provided by the compressed image data apparatus are received through a compressed image data interface included in an overlay display/storing board. The compressed image data thus received are stored in a memory temporarily under the control of a display/storing controller. The compressed image data stored in the memory is stored in a hard disk under the control of a central processing unit. On the other hand, a video decoder converts the analog video signals provided by the compressed image data apparatus into digital data. Also, the display/storing controller provides the digital data outputted by the video decoder to a graphic board part. Further, the graphic board part controls display of the digital data on a monitor of a the computer. In this way, data storing with visual confirmation of the inputted images can be carried out by the system having a simple structure.

In an overlay display/memory board according to the present invention, a video decoder converts analog video signals into digital data, the analog video signals corresponding to the compressed image data being outputted by the compressed image data apparatus which outputs the analog video signals when compressed image data are outputted therefrom. Also, a display/storing controller connected to the video decoder and a compressed image data interface provides digital data outputted by the video decoder to a graphic board part connected to the monitor through a bus line while storing compressed image data to a memory of the computer through the compressed image data interface via the bus line. In this way, data storing with a high speed video overlay an be carried out as well as decreasing CPU load.

In an overlay display/memory board according to he present invention, compressed image data and analog video signals corresponding to the compressed image data are outputted by the compressed image data apparatus in a first operating mode. A display/storing controller provides digital data converted by a video decoder to a graphic board part which controls display of a monitor of a computer system through a bus line while storing compressed image data received through a compressed image data interface to a memory of the computer system in an overlay display/memory mode. In this way, data storing to the hard disk with video overlay on the monitor can be carried out by just performing a step for transmitting the data stored in the hard disk.

Also, the display/storing controller provides compressed image data stored in the hard disk of the computer system to the compressed image data apparatus through the compressed image data interface in a playback/display mode. The compressed image data apparatus is capable of being inputted compressed image data therein from outside and analog video signals being decompressed and converted by the compressed image data apparatus are outputted therefrom in a second operation mode. In this way, the analog video signals thus outputted are provided to the video decoder. The display/storing controller outputs the digital data converted by the video decoder to the graphic board part through the bus line. Therefore, reproduction of images can be carried out even when no means for decompressing the compressed image data is included in the computer.

In a data storing method according to the present invention, the compressed image data provided by the apparatus are stored in a data storing medium while displaying images in accordance with the analog video signals provided by the apparatus during a data storing mode when the apparatus is in the first mode, and the compressed image data stored in the data storing medium are provided to the apparatus, and images on a display screen are displayed in accordance with the analog video signals provided by the apparatus during a data reproduction mode when the apparatus is in the second mode. In this way, the compressed image data can be stored while displaying the image data from the compressed image data apparatus without installing a dedicated board or means dedicated for image compression on the computer because the analog video signals corresponding to the compressed image data are outputted by the compressed image data apparatus.

In a data storing method according to the present invention, compressed image data provided through a compressed image data terminal of a compressed image data apparatus are stored in a data storing medium of a computer system without carrying out decompression while displaying images on a display screen of the computer system in accordance with the compressed image data provided by the compressed image data apparatus. In this way, the compressed image data can be stored while displaying the image data from the compressed image data apparatus without installing a dedicated board or means dedicated for image compression on the computer because the analog video signals corresponding to the compressed image data are outputted by the compressed image data apparatus.

In a data reproduction method according to the present invention, images generated in accordance with compressed image data stored in a data storing medium of a computer system are displayed on a display screen of the computer system, the method comprises the following steps; connecting a compressed image data apparatus with the computer system, the compressed image data apparatus carrying out decompression of compressed data, converting digital signals into analog signals, and outputting the analog signals thus converted therefrom, providing the compressed image data stored in the data storing medium to the compressed image data apparatus, and displaying images on the display screen in accordance with the analog signals received from the compressed image data apparatus, the analog signals being decompressed. In this way, the compressed image data can be reproduced without installing a dedicated board or means dedicated for image compression on the computer.

Definition of words and a phrase used in the appended claims, and correspondence between these words and the phrase to words and a phrase used in the embodiments herein are as follows.

The word "storing means" correspond to the memory 27 and the hard disk 26 depicted in FIG. 2 in the embodiments described above.

Figure 3:
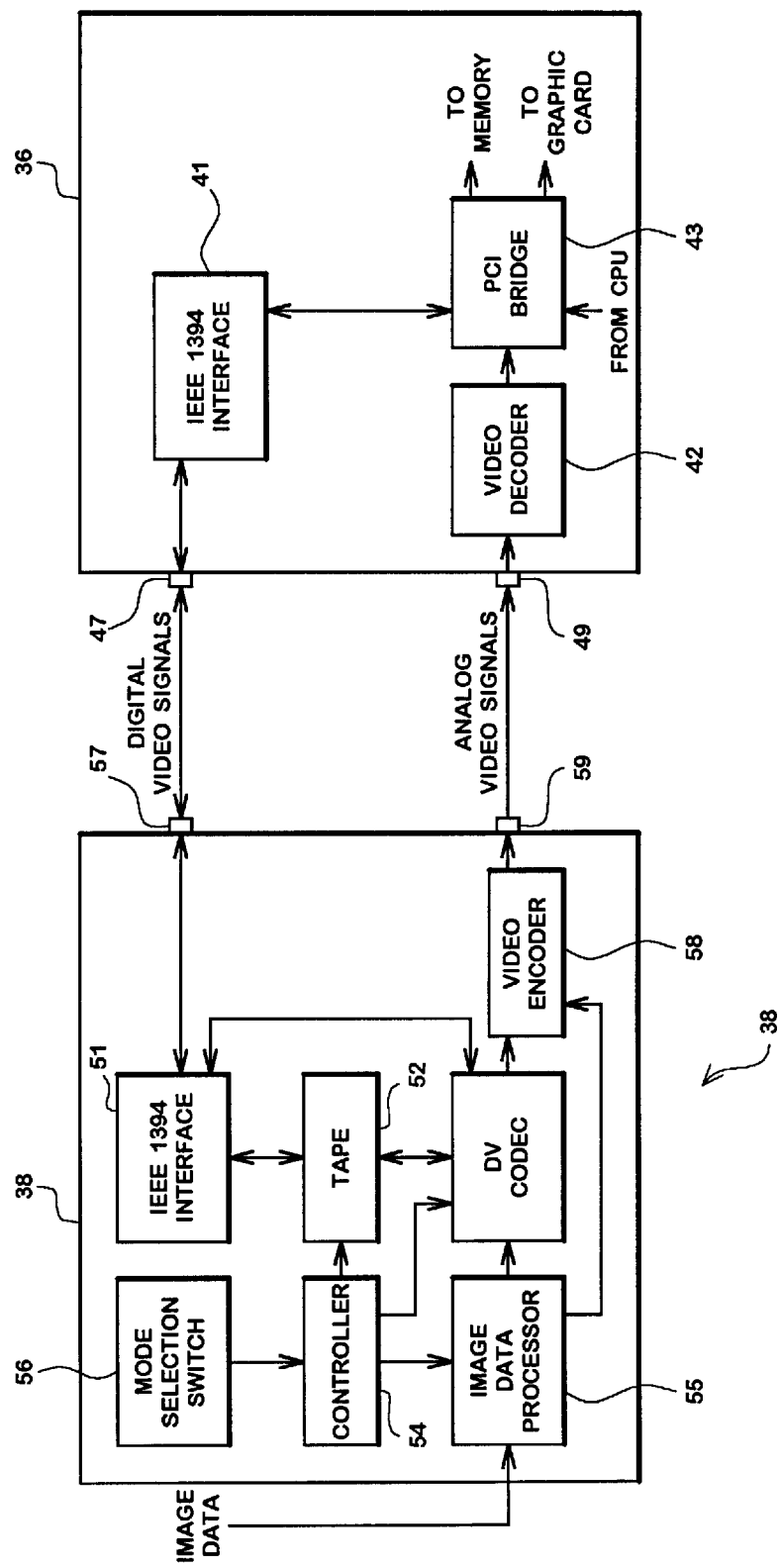
FIG. 3 is another block diagram illustrating details of a DV camera and an overlay display/memory board.
Figure 4:
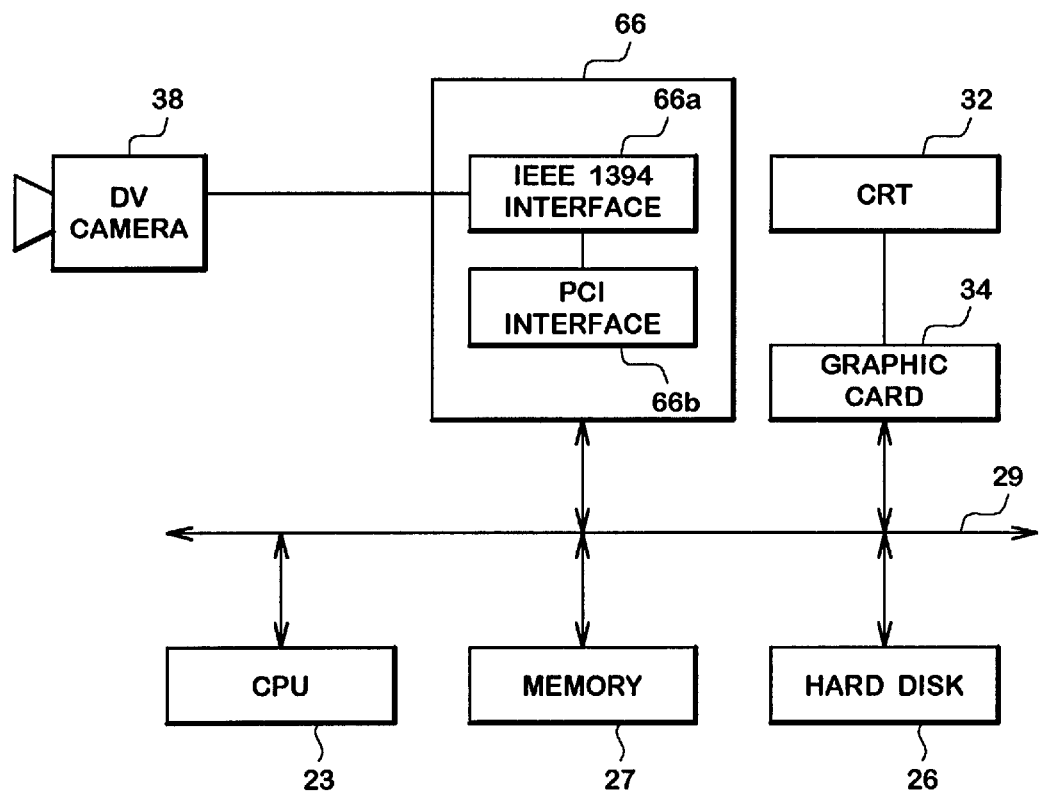
FIG. 4 is other block diagram illustrating hardware structure of the conventional data storing/reproduction system.

Another word "converting means" correspond to the PCI bridge 43 shown in FIG. 3 in the embodiments described above.

Data transmission to each of the memory 27, the graphic card 34, and the interface 41 carried out by the PCI bridge 43, and that to the hard disk 26 from the memory 27 carried out by the CPU 23 correspond respectively to the word "control".

Another word "display/storing controller" correspond to the PCI bridge 43 shown in FIG. 3 in the embodiments described above.

Another word "display means" correspond both to the graphic card 34 and the CRT 32 shown in FIG. 2 in the embodiments described earlier.

Another word "graphic board part" correspond to the graphic card 34 depicted in FIG. 2 in the embodiments described in above.

Another word "compressed image data" means image data being compressed, regardless of its method, degree of compression, and other factors.

Words "decompressed, decompression" means a step to carry out decoding of compressed image data, it is also referred to as expansion of data.

A phrase "analog video signals corresponding to compressed image data" undoubtedly includes signals being decoded from compressed image data and then converted into analog format, and the phrase also includes signals being converted into analog format before decoding the compressed image data.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A data storing system capable of storing compressed digital video image data while displaying images in accordance with the compressed digital video image data, the system comprising:

A) a compressed image data apparatus, outputting analog video signals when the compressed digital video image data are outputted therefrom, the analog video signals corresponding to the compressed digital video image data, B) a computer including:
b1) a memory, storing compressed digital video image data provided thereto temporarily,
b2) a central processing unit, performing control of storing the compressed digital video image data into a hard disk, the compressed digital video image data being stored in the memory,
b3) a monitor for the computer, displaying image data provided thereto, and
b4) a graphic board, controlling display of the monitor, and C) an overlay display/storing board connected to said apparatus and to said computer, said board including:
c1) a video decoder, converting the analog video signals into digital data, the analog video signals being provided by the apparatus,
c2) a compressed digital video image data interface, receiving the compressed digital video image data provided by the apparatus, the compressed digital video image data interface being connected to the apparatus,
c3) a display/storing controller, providing the digital data outputted by the video decoder to the graphic board while storing the compressed digital video image data into the memory through the interface, the display/storing controller being connected to the video decoder and the compressed digital video image data interface,
wherein said overlay display/storing board receives the analog video signal corresponding to the compressed digital video image data from said apparatus in decompressed form and digitizes the analog video signal to the digital data and provides the digital data to the graphic board while the compressed digital video image data is provided to the memory of the computer.

2. The data storing system in accordance with claim 1, the compressed image data apparatus is a digital video camera.

3. The data storing system in accordance with claim 1, wherein the compressed image data are data being compressed in a discrete cosine transform.

4. An overlay display/memory board for a computer with a graphic board and a memory, said overlay display/memory board being connectable to a compressed image data and analog video signal apparatus and to said computer, said overlay display/memory board comprising:

a compressed image data interface connectable to the apparatus, the interface to receive compressed digital video image data provided by the apparatus, a video decoder connectable to the apparatus to convert analog video signals into digital data, the analog video signals to be outputted by the apparatus, the analog video signals corresponding to the compressed digital video image data, and a display/storing controller connected to the video decoder and the interface and connectable to a bus line, the controller to provide the digital data outputted by the video decoder to the graphic board through the bus line and to provide the compressed digital video image data to the memory of the computer through the interface via the bus line, wherein said overlay display/storing board can receive the analog video signal corresponding to the compressed digital video image data from said apparatus in decompressed form and can digitize the analog video signal to the digital data and then can provide the digital data to the graphic board of the computer and at the same time the compressed digital video image data can be provided to the memory of the computer.

5. The overlay display/memory board in accordance with claim 4, wherein the compressed image data apparatus is a digital video camera.

6. The overlay display/memory board in accordance with claim 4, wherein the compressed image data are data being compressed in a discrete cosine transform.

7. A method for using an overlay display/memory board with a computer having a graphic board and a data storing medium, said method for storing/reproducing compressed digital video image data provided by a compressed image data apparatus, the board being connected to the apparatus, the apparatus capable of switching to one of a first operating mode and a second operating mode, the apparatus performing in each of the following operating modes:

a1) in the first operating mode, the apparatus outputting compressed digital video image data while outputting analog video signals converted from uncompressed digital image data which is decompressed from the compressed image data, a2) in the second operating mode, the apparatus outputting analog video signals converted from uncompressed digital image data which is decompressed from the inputted compressed image data from outside, the method comprising the steps of:

communicating via said overlay display/memory board the compressed digital video image data provided by the apparatus and storing in the data storing medium of the computer while also digitizing and communicating via said overlay display/memory board the analog video signals provided by the apparatus during a data storing mode when the apparatus is in the first mode to the graphic board of the computer to display images on a display screen of the computer, and providing the compressed digital video image data stored in the data storing medium of the computer to the apparatus, and displaying images on the display screen of the computer in accordance with the analog video signals provided by the apparatus via said overlay display/memory board during a data reproduction mode when the apparatus is in the second mode.

8. The data storing/reproduction method in accordance with claim 7, wherein the compressed image data apparatus is a digital video camera.

9. The data storing/reproduction method in accordance with claim 7, wherein the compressed image data are data being compressed in a discrete cosine transform.

10. A method for using an overlay display/memory board with a computer having a graphic board and a data storing medium, said method for storing compressed digital video image data provided by a compressed image data apparatus in the data storing medium of the computer via said overlay display/memory board while displaying images in accordance with the compressed digital video image data on a display screen of the computer, the method comprising the steps of:

connecting the overlay display/memory board to the apparatus having a compressed digital video image data terminal and an analog video signal terminal and to the computer, the apparatus outputting the compressed digital video image data through the data terminal, and outputting analog video signals through the signal terminal, the analog signals being converted in the apparatus from uncompressed digital image data which is decompressed from the compressed digital video image data outputted through the data terminal, and communicating through the overlay display/memory board the compressed digital video image data provided by the apparatus to the storing medium of the computer without carrying out decompression thereof while also converting the analog video signals from the apparatus to digital image data and communicating the digital image data to the graphic board to display images on the display screen of the computer.

* * * * *